Sept. 15, 1936. M. HALUSKA 2,054,749
VEHICLE WARNING SIGNAL
Filed Feb. 6, 1936 2 Sheets-Sheet 1

Inventor
M. Haluska

By Clarence A. O'Brien
Hyman Berman
Attorneys

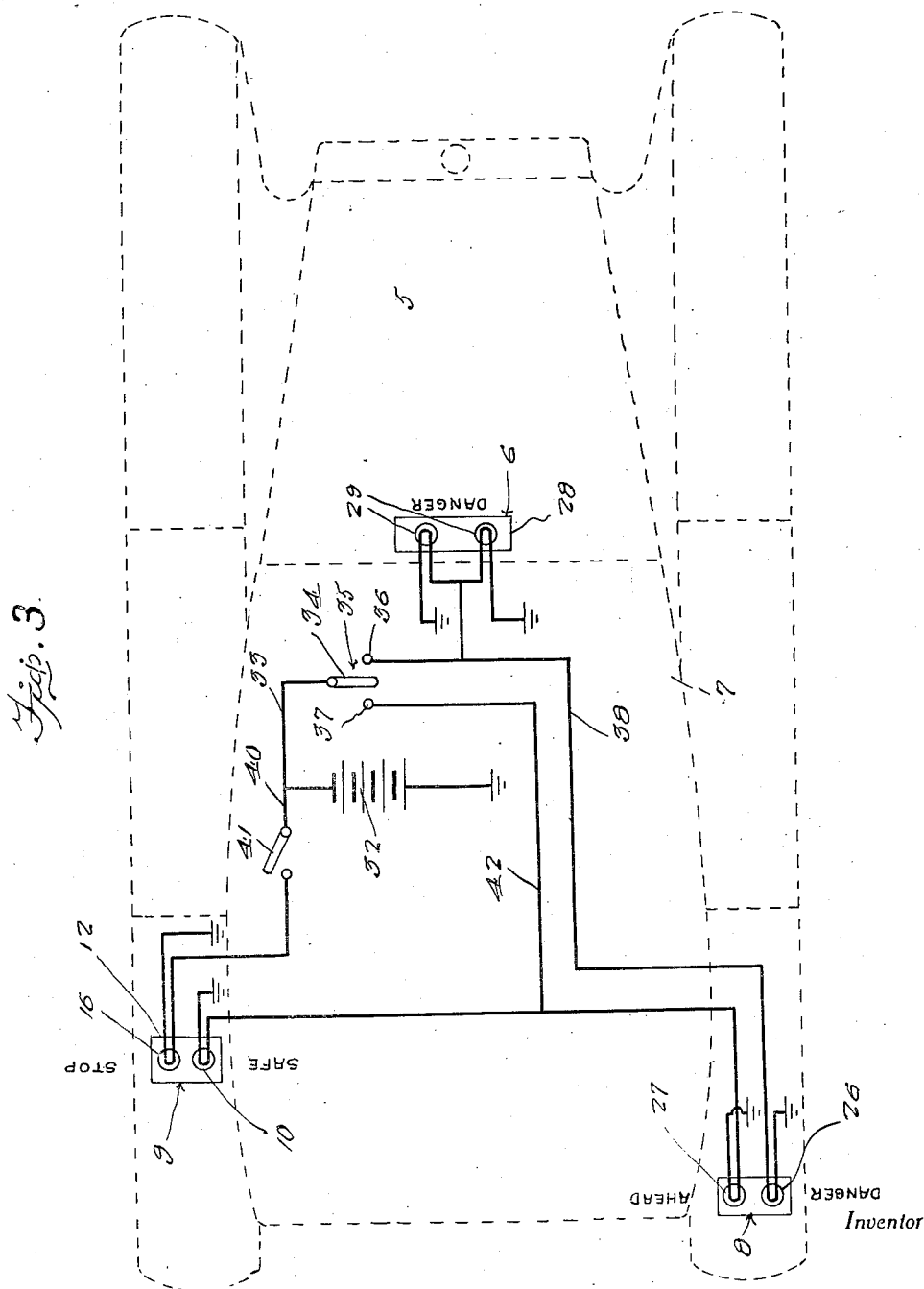

Patented Sept. 15, 1936

2,054,749

UNITED STATES PATENT OFFICE 2,054,749

VEHICLE WARNING SIGNAL

Michael Haluska, St. Clair, Pa.

Application February 6, 1936, Serial No. 62,680

1 Claim. (Cl. 177—337)

This invention appertains to new and useful improvements in the general art of electrical signaling and more particularly to a signal means for automobiles.

The principal object of the present invention is to provide a signal means for automobiles which will get away from the direction signal by which various improvements have been developed and to provide signal means for simply warning rearwardly approaching vehicles of the safety or danger of passing the car so equipped and also to warn forwardly approaching vehicles of danger especially when the car so equipped intends to make a turn in the path of such a forwardly approachinng vehicle.

During the course of the following specification other important objects and advantages of the invention will become apparent to the reader.

In the drawings:

Figure 3 is a diagrammatic view disclosing the electrical connection between the electrical devices involved.

Figure 1:
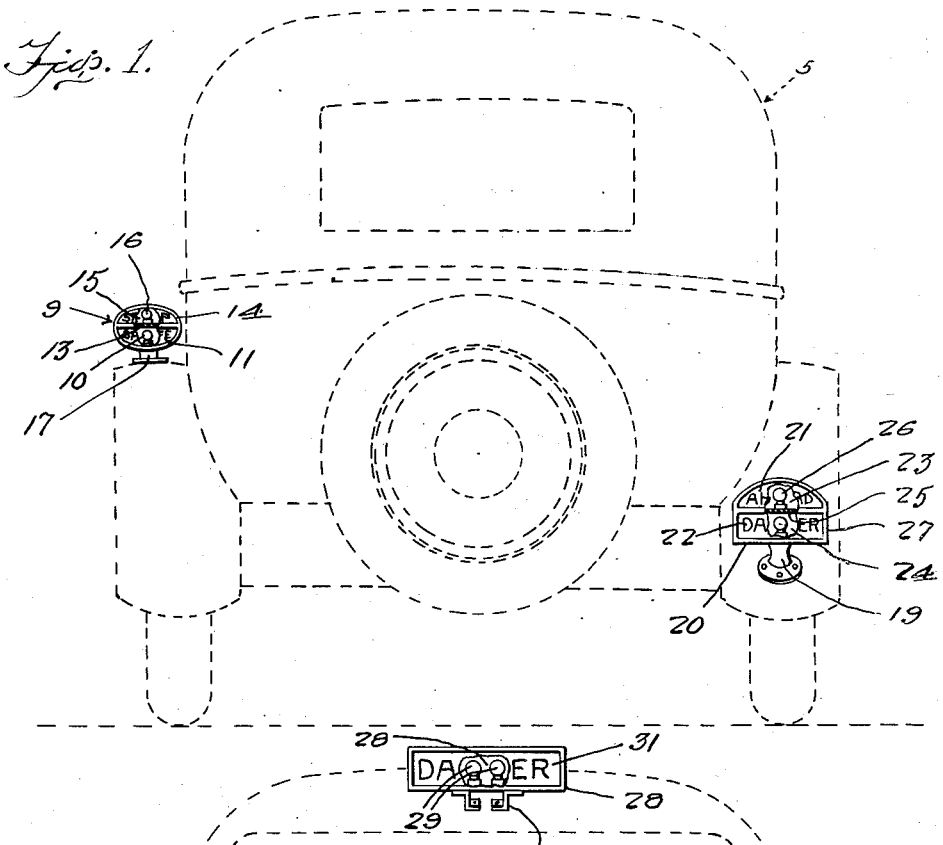
Figure 1 is an elevational view of the rear signal devices with the automobile in dotted lines.
Figure 2:
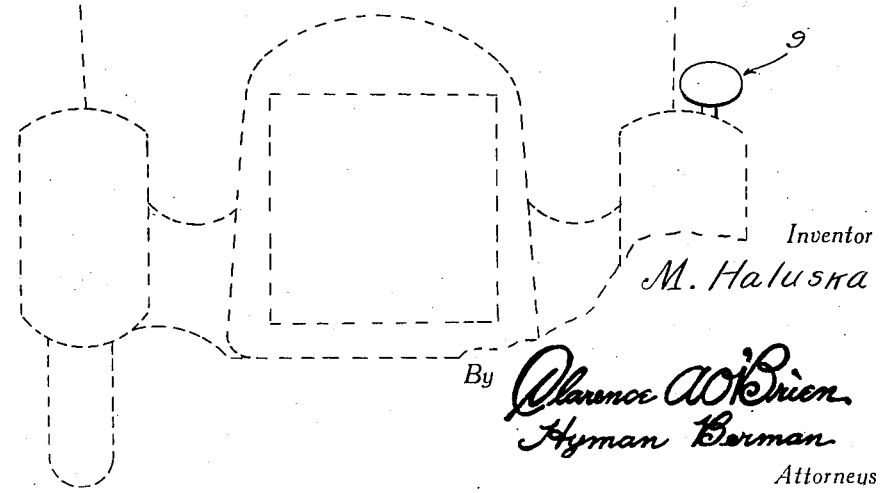
Figure 2 is an elevational view of the front signal device showing the automobile in dotted lines.

Referring to the drawings wherein like numerals designate like parts, it can be seen in Figure 3 that numeral 5 generally refers to an automobile on which is mounted the danger signal generally referred to by numeral 6, the forward portion of the cab 7 immediately above the windshield thereof. This danger signal 6 will be mounted in different places at the front of the automobile on various other designs of cars.

Figure 3 represents a signal device for rendering electrically a "head" or a "danger" signal, while the third signal device denoted by numeral 9 is located on the left rear fender and is also intended to act as a signal, having a slight bulb 10 therein behind a colored pane 11 for indicating "Safe" when the bulb 10 is energized. This signal device 9 consists of the casing 12 divided by the horizontal partition 13, with the front cover 14 provided with the pane 11 of one color and the pane 15 of another color, while behind this pane 15 is located the bulb 16 which may serve as the usual stop light. The casing 12 may be provided with a suitable support 17 whereby it can be attached to the left rear fender.

The device 8 on the right rear fender consists of a support 19 and a front cover 20 carrying an upper pane 21 and a lower pane 22 located in front of compartments 23—24 respectively which compartments are defined by a partition 25. In the upper and lower compartments 23—24 are the bulbs 26—27 respectively which when energized will illuminate the words "Danger" and "Ahead" on the panes 21—22 respectively.

The front signal 6 consists of the stream-lined casing 28 having a pair of bulbs 29—29 therein while a suitable support 30 serves to support the case 28 upon the body of the vehicle. Numeral 31 represents a front pane for the case 28 on which is located the word "Danger".

Referring to Figure 3, it can be seen that numeral 32 represents the source of current from which the lead wire 33 extends into the contactor 34 of the switch generally referred to by numeral 35 and which contactor is selectively engageable with the contacts 36—37. Extending from the contact 36 of the switch 35 is the conductor 38 which extends to the bulb 26 of the signal device 8 and as can be seen in Figure 3 a wire 39 extends from the conductor 38 and connects to the bulbs 29—29 of the front signal device 6 to connect the same in multiple. From the lead wire 33 a conductor 40 extends to the stop light 16 and in this is the stop light switch 41.

From the contact 37 a wire 42 extends to both the "Safe" bulb 10 in the signal device 9 and the "Ahead" bulb 27 in the signal device 8.

It can now be seen, that when the contactor 34 is thrown on the contact 36 both the "Danger" lights 29—29 and 26 of the devices 6 and 8 will be energized. On the other hand when the contactor 34 is moved to engage the contact 37 the "Safe" bulb 10 of the device 9 will energize.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

In combination with an automobile having rear fenders, a danger signal for attachment to the front of the automobile, a signal device adapted to be attached to each of the rear fenders, the signal device on the rear right fender containing a "Danger" and an "Ahead" light, the remaining signal device containing the "Safe" and a "Stop" device, a source of current, a connection between the source of current and the "Stop" light, said connection having a switch therein, and switch means between the battery and the remaining light whereby the "Danger" signal light can be energized at one time and the "Ahead" and "Safe" lights energized at another time.

MICHAEL HALUSKA.